United States Patent [19]

Uematsu

[11] Patent Number: 5,300,733
[45] Date of Patent: Apr. 5, 1994

[54] WATER IMPERVIOUS RUBBER OR PLASTIC INSULATED POWER CABLE

[75] Inventor: Tadayuki Uematsu, Peachtree City, Ga.

[73] Assignee: The Furukawa Electric Co., Ltd., Tokyo, Japan

[21] Appl. No.: 984,201

[22] Filed: Nov. 30, 1992

[51] Int. Cl.$^5$ .............................................. H01B 7/18
[52] U.S. Cl. ........................ 174/106 SC; 174/120 SC
[58] Field of Search ................. 174/98, 102 R, 106 R, 174/106 SC, 107, 108, 120 R, 120 C, 120 SC, 120 AR; 29/825; 228/178

[56] References Cited

U.S. PATENT DOCUMENTS

| | | | |
|---|---|---|---|
| 3,790,697 | 2/1974 | Buckingham | 174/108 X |
| 3,812,283 | 5/1974 | Kothe et al. | 174/106 R X |
| 3,829,602 | 8/1974 | Ishikawa et al. | 228/178 X |
| 4,461,076 | 7/1984 | Plummer, III | 29/825 |
| 4,472,597 | 9/1984 | Uematsu | 174/106 SC |
| 4,552,989 | 11/1985 | Sass | 174/107 X |
| 4,559,973 | 12/1985 | Hane et al. | |
| 4,626,619 | 12/1986 | Uematsu | 174/106 SC |
| 4,703,134 | 10/1987 | Uematsu | 174/106 SC |

FOREIGN PATENT DOCUMENTS

3-118510  12/1991  Japan .

Primary Examiner—Peter Dungba Vo
Attorney, Agent, or Firm—Frishauf, Holtz, Goodman & Woodward

[57] ABSTRACT

A water impervious rubber or plastic insulated power cable, which is capable of maintaining water imperviousness for an extended period of time, is provided, which power cable comprising: a cable core having a conductor, an extruded conductor shield, a rubber or plastic insulation layer and an extruded insulation shield, the last three members being sequentially formed around the conductor; a water impervious layer which is provided around the cable core and which includes a laminate tape comprising a metal foil and a plastic laminated on at least one surface of the metal foil; an extruded jacket layer which is extruded on the water impervious layer and which is made integral with the plastic of the water impervious layer; a metal shield layer which is provided around the extruded jacket layer and which includes metallic wires; and a corrosion-protective layer which is extruded on the metal shield layer and in which the metal shield layer is embedded.

16 Claims, 2 Drawing Sheets

WATER IMPERVIOUS RUBBER OR PLASTIC INSULATED POWER CABLE

BACKGROUND OF THE INVENTION

1. Field of the Invention

The present invention relates to a water impervious rubber or plastic insulated power cable, and more particularly, to a water impervious insulated power cable, which is capable of exhibiting excellent water imperviousness for a long period of time, compared with a conventional water impervious rubber or plastic insulated power cable.

2. Prior Art

A typical rubber or plastic insulated power cable (hereinafter referred to as a "power cable") comprises a metal shield layer and a corrosion-protective layer (sheath layer) covering a cable core, which has a conductor, an extruded shield, a rubber or plastic insulation layer and an extruded insulation shield; the last three members being sequentially formed around the conductor. In this power cable, it is important to protect the cable core from the entry of water in the external environment of the cable.

As a conventional power cable provided with waterproof measures, there is one comprising a metal-plastic laminate tape, which is longitudinally applied under a corrosion-protective layer so that its plastic surface is positioned on the corrosion-protective layer side, and the plastic surface and the corrosion-protective layer being made into one united body to form a water impervious layer as disclosed under U.S. Pat. No. 4,472,597.

In the power cable provided with such a water impervious layer, however, there is the danger that, if the corrosion-protective layer should be damaged due to some cause or other, the water impervious layer, which is made integral with the corrosion-protective layer, will easily be affected by the damage. For this reason, it is an unavoidable problem that the water impervious property of the power cable deteriorates if the corrosion-protective layer incurs a damage.

To solve the aforementioned problem, the inventor has completed an invention on a power cable, wherein a laminate tape consisting of a metal tape and an electrically conductive plastic tape is used as the water impervious layer tape in the above-mentioned structure, and the laminate tape is longitudinally applied so that its electrically conductive plastic layer faces the cable core, thereby forming the electrically conductive plastic layer and an insulation shield into one body (refer to U.S. Pat. No. 4,626,619).

Further, the inventor has completed a power cable having a structure, as shown in FIG. 1, consisting of a conductor shield 2, an insulation layer 3, an insulation shield 4, and a water impervious layer 5 formed in sequence around conductors 1, and a semiconductive fabric tape-wrapped layer 6 formed by lapping a semiconductive fabric tape, which consists of an electrically conductive rubber applied to a woven fabric which has a good heat cycle following property and a memory rate of expansion and contraction thereof is 30% or more, around the water impervious layer 5 (U.S. Pat. No. 4,703,134).

When a power cable is in actual use, the power cable is subjected to frequent repetition of energizing and de-energizing. As a result, the power cable is continually subjected to heat cycles wherein the temperature of the whole cable including the cable core rises during the energizing period, while the temperature drops during the de-energizing period. Therefore, the cable core, the metal shield layer and the like of the power cable naturally repeat expansion and contraction due to the heat cycles. The repetition of the expansion and contraction adds to the fatigue of and damage (cracks or the like) to the composing materials, especially the water impervious layer, or the power cable, significantly leading to a shortened service life of the product.

In the power cables described in the specifications of U.S. Pat. Nos. 4,559,973 and 4,703,134, the water impervious layer and the cable core are made into one united body; therefore, the fatigue of and damage to the water impervious layer (mainly the metal tape) are increased by the repetitive expansion and contraction of the cable core caused by the heat cycles.

The power cable described in the specification of U.S. Pat. No. 4,703,134 has a special semiconductive fabric tape-wrapped layer with a good heat cycle following property provided between the water impervious layer and the metal shield layer; therefore, the damage to the water impervious layer from the expansion and contraction of the cable core and the metal shield layer can be significantly reduced.

In this power cable, however, as is obvious from FIG. 1, an edge portion of the semiconductive fabric tape constituting the semiconductive fabric tape-wrapped layer 6 forms discontinuity portion in terms of configuration and also the pressure applied to the water impervious layer 5. As a result, the metal tape constituting the water impervious layer 5 becomes susceptible to fatigue and damage at the discontinuity portion during the heat cycles. In addition, during the aforesaid heat cycles, the semiconductive fabric tape-wrapped layer 6 and the water impervious layer 5 rub against each other, contributing also to the fatigue of and damage to the water impervious layer 5.

Thus, the power cables proposed by the inventor previously both provide excellent characteristics as power cables, however, they still have room left for improvement in respect of the deterioration of water impervious property caused by the fatigue of and damage to the composing material primarily due to the heat cycles.

OBJECT AND SUMMARY OF THE INVENTION

An object of the present invention is to provide a power cable whose composing materials incur reduced fatigue and damage with consequent minimized deterioration in its water impervious property even if the cable is subjected to heat cycles for a long period of time.

To fulfill the above-mentioned object, a water impervious rubber or plastic insulated power cable is provided, which power cable comprising: a cable core having a conductor, an extruded conductor shield, a rubber or plastic insulation layer and an extruded insulation shield, the last three members being sequentially formed around the conductor; a water impervious layer which is provided around the cable core and which includes a laminate tape comprising a metal foil and a plastic laminated on at least one surface of said metal foil; an extruded jacket layer which is extruded on the water impervious layer and which is made integral with the plastic of the aforesaid water impervious layer; a metal shield layer which is provided around the extruded jacket layer and which consists of metallic wires; and a corrosion-protective layer which is extruded on the aforesaid metal shield layer and in which the metal shield layer is embedded.

In the power cable according to the present invention, the cable core and the water impervious layer, which is located over it, are in direct contact but they are not made into one united body, while an electrically conductive plastic film of the water impervious layer is fusion-bonded with the extruded jacket layer, which is located over it, to be formed into one united body. Accordingly, the water impervious layer and the extruded jacket layer do not necessarily move as one body with the cable core. As a result, the water impervious layer develops less fatigue even after the cable core repeatedly expands and contracts due to prolonged heat cycles.

In addition, the metal shield layer formed on the extruded jacket layer is fixed by being buried in the corrosion-protective layer; therefore, there are less chances of the metal shield layer being dislocated during heat cycles, easing an external pressure applied by the metal shield layer to the water impervious layer via the extruded jacket layer.

DETAILED DESCRIPTION OF THE INVENTION

Figure 1:
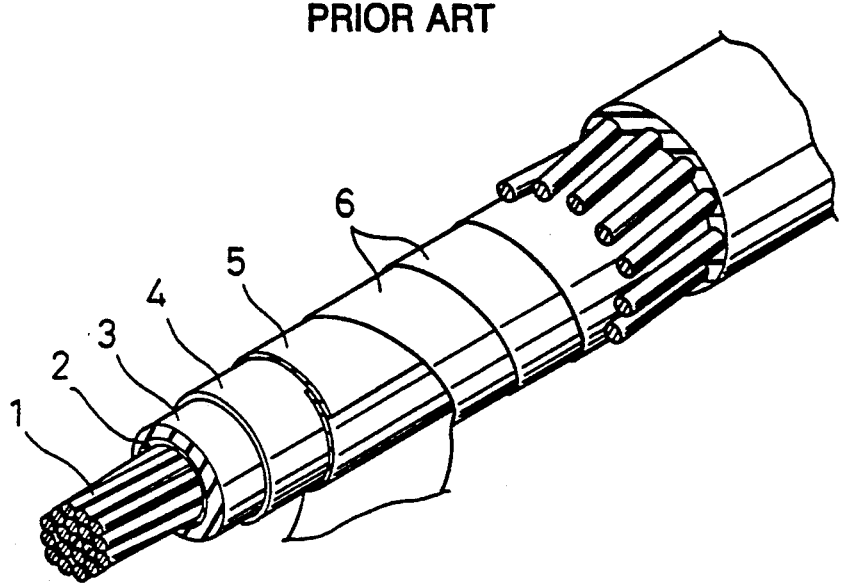
FIG. 1 is a perspective view which shows a construction of a conventional water impervious rubber or plastic insulated power cable.
Figure 2:
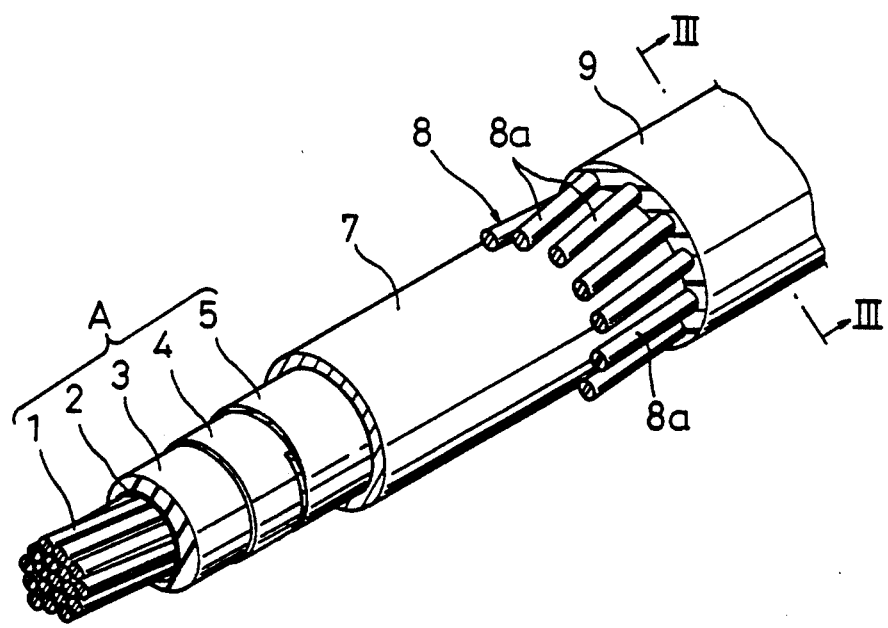
FIG. 2 is a perspective view which shows a construction of a water impervious rubber or plastic insulated power cable according to the present invention.
Figure 3:
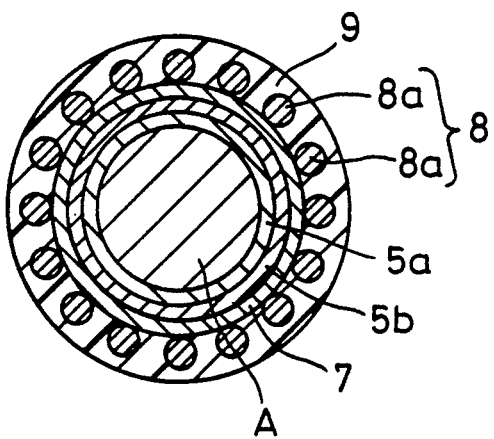
FIG. 3 is a cross-sectional view taken along line III—III of FIG. 2.

As shown in FIG. 2 and FIG. 3, which is a cross-sectional view taken along line III—III of FIG. 2, the power cable according to the present invention has a water impervious layer 5 comprising a metal foil 5a and an electrically conductive plastic film 5b, an extruded jacket layer 7, a metal shield layer 8 comprising a plurality of copper wires 8a, and a corrosion-protective layer (sheath layer) 9 which are formed on a cable core A in the order in which they are listed.

The cable core A and the water impervious layer 5 are in direct contact via the surface on the metal foil 5a side thereof but are not made in one body, in the case of one-side laminate tape for water impervious layer. The water impervious layer 5 and the extruded jacket layer 7 are fusion-bonded into one body via the electrically conductive plastic layer 5b which is laminated with the metal foil 5a. Further, the plurality of copper wires 8a, which constitute the metal shield layer 8, are embedded and fixed in the corrosion-protective layer 9. According to a regular method, the cable core A is comprised of a conductor 1, a conductor shield 2, an insulation layer 3, and an insulation shield 4, the last three members being sequentially formed around the conductor 1. As the conductor 1, stranded wires with semiconductive waterproof compound filled in the gaps between the wires are preferable.

The water impervious layer 5 is formed by longitudinally applying the metal foil 5a, which has the electrically conductive plastic layer 5b made of plastic or rubber imparted with electrical conductivity on one surface or both surfaces thereof, on the cable core A in such a manner that the electrically conductive plastic layer 5b always faces the extruded jacket layer 7, and heating to bond an overlapping section.

A copper, lead or aluminum tape, for example, may be used for the metal foil 5a constituting the water impervious layer 5.

The metal foil 5a preferably has a thickness of 0.010 to 0.10 mm, while the electrically conductive plastic layer 5b preferably has a thickness of 0.05 to 0.20 mm.

The plastic or rubber constituting the electrically conductive plastic layer 5b, which is laminated to the metal foil 5a, may be such rubbers or plastics as low-, medium- or high-density polyethylene, polypropylene, polybutene-1, polymethyl pentene, ethylene-propylene copolymer, ionomer, ethylene-ethyl acrylate copolymer, ethylene-vinyl-acetate-vinyl-chloride-graft copolymer, chlorinated polyethylene, chlorosulphonated polyethylene, polyisoprene rubber, chloroprene rubber, acrylonitrile-butadiene rubber, and styrene-butadiene rubber.

Electrical conductivity is imparted to these rubbers or plastics by mixing with electrically conductive carbon blacks (e.g., acetylene black, Ketjenblack, and furnace black) or applying electrically conductive compound to fibrous tapes made of the aforementioned plastics or rubbers.

From the point of the electrical performance (especially partial discharge) of the power cable, it is desirable that the volume resistivity of the electrically conductive rubber or plastic be $10^6$ Ω·cm or less.

The extruded jacket layer 7 is formed by extruding it over the water impervious layer 5, and it is fusion-bonded into one body with the electrically conductive plastic layer 5b by the heat at the time of the extrusion.

The forming material for the extruded jacket layer 7 should be the one which is compatible with the forming material of the electrically conductive plastic layer 5b, so that it can be easily bonded with the electrically conductive plastic layer 5b into one body. Accordingly, for example, the same plastics or rubbers used for forming the aforementioned electrically conductive plastic layer 5b can be used. Further, the forming material of the extended jacket layer 7 can be provided with flame resistance or incombustibility by mixing with a well-known flame-retardant material, an incombustible material or a carbon black.

It is desirable that the volume resistivity of the extruded jacket layer 7 be $10^6$ Ω·cm or less to maintain good electrical contact between the metal foil 5a constituting the water impervious layer 5 and the metal shield layer 8 provided on the outer side of the extruded jacket layer 7.

The metal shield layer 8 is formed by arranging a plurality of, for example, copper wires 8a, on the extruded jacket layer 4 in a spiral shape or SZ shape. The corrosion-protective layer 9 is formed by extruding it on the metal shield layer 8, and the metal shield layer 8 (the plurality of metal wires 8a) is embedded and fixed in the corrosion-protective layer 9.

In the power cable according to the present invention, even when the cable core A repeats expansion and contraction due to heat cycles applied over an extended period of time, the water impervious layer 5 does not move in one body with the cable core A since the water impervious layer 5 is not fusion-bonded to be made integral with the external semiconductive layer 4, which forms the outermost layer of the cable core A, although they are in direct contact. This significantly reduces the fatigue developed in the water impervious layer 5 caused by heat cycles. Further, the plurality of copper wires 8a constituting the metal shield layer 8 formed on the extruded jacket layer 7 are fixed in the corrosion-protective layer 9, thus minimizing the chance of the aforesaid copper wires 8a being dislocated during heat cycles and also easing the external pressure applied by the copper wires 8a to the water impervious layer 5 via the extruded jacket layer 7.

EXAMPLE 1

In the manufacture of a 35 KV 1/0 AWG water impervious XLPE insulated power cable, a laminate tape, which includes electrically conductive polyethylene laminated on both surfaces of a lead tape consisting of electrically conductive polyethylene (100 μm thick), lead (30 μm thick), and electrically conductive polyethylene (100 μm thick), was longitudinally applied onto an insulation shield of a cable core, and an overlapping allowance of about 30 mm was provided, and the overlapping section was heated to bond it, thus a plastic layer of a water impervious layer. Thereafter, an electrically conductive polyethylene compound with a flame-retardant material blended in was extruded onto the water impervious layer to an approximately 1.0 mm thickness to form an extruded jacket layer, then the structure was fusion-bonded by the heat and pressure at the extrusion process with the water impervious layer into one body.

Next, sixteen copper wires, each having a 1.6 mm diameter, were wound spirally on the extruded jacket layer to form a metal shield layer, and further, flame-retardant polyethylene was extruded onto the copper wires to embed them to form a corrosion-protective layer, thus manufacturing the power cable shown in FIG. 2 and FIG. 3.

The following heat cycle test was conducted using the water impervious power cable. The results are shown in Table 1.

A water impervious power cable of a 3-meter length is bent reversely twice around a mandrel, which has a diameter as large as 10 times that of the outside diameter of the cable, then straightened. The cable is then drawn into a polyethylene pipe to subject it to heat cycles, each cycle consisting of six-hour energizing and six-hour de-energizing of the conductor. During the heat cycles, the ambient temperature was adjusted so that the temperature of the conductor is 130° C. and that of the water impervious layer is 90° C. while energizing. Also, adjustment was performed so that the temperature of the water impervious layer is 35° C. while de-energizing.

For the purpose of evaluation, the cables subjected to different numbers of heat cycles shown in Table 1 were taken apart at the central portions for 50 cm to expose the metal tapes of the water impervious layers, and visual check was carried out for the presence of cracks. The results of no cracks are denoted by "○," minute cracks by "Δ," and cracks all over by "x."

EXAMPLE 2

In the manufacture of a 35 KV 1/0 AWG water impervious XLPE insulated power cable, a laminate tape, which includes electrically conductive polyethylene laminated on both surfaces of an aluminum tape consisting of electrically conductive polyethylene (50 μm thick), aluminum (20 μm thick), and electrically conductive polyethylene (50 μm thick), was longitudinally applied onto an insulation shield of a cable core, and an overlapping allowance of about 20 mm was provided, and the overlapping section was heated to bond it, thus forming a water impervious layer. Thereafter, an electrically conductive polyethylene compound with a flame-retardant material blended in was extruded onto the water impervious layer to an approximately 1.0 mm thickness to form an extruded jacket layer, then the structure was fusion-bonded by the heat and pressure at the extrusion process with the water impervious layer into one body. Next, sixteen copper wires, each having a 1.6 mm diameter, were wound spirally on the extruded jacket layer to form a metal shield layer, and further, flame-retardant polyethylene was extruded onto the copper wires to embed them to form a corrosion-protective layer, thus manufacturing the power cable. This cable was subjected to the same test as Example 1. The results are shown in Table 1.

Control 1

In the manufacture of a 35 KV 1/0 AWG water impervious XLPE insulated power cable, a laminate tape consisting of electrically conductive polyethylene (100 μm thick), lead (30 μm thick), and electrically conductive polyethylene (100 μm thick) was longitudinally applied onto an insulation shield of a cable core with an overlapping allowance of approximately 30 mm. Thereafter, a semiconductive cloth tape (0.21 mm thick), which was obtained by friction-treating a polyester base cloth with electrically conductive rubber, was wound around the structure with a ½ lap. This was then passed through a heating furnace to bond the laminate tape and the insulation shield into one body. Thereafter, sixteen copper wires, each having a diameter of 1.6 mm, were spirally arranged around the structure, flame-retardant polyethylene was extruded onto the copper wires to embed the copper wires, thus manufacturing the power cable. This power cable was subjected to the same test as Example 1. The results are shown in Table 1.

Control 2

In the manufacture of a 35 KV 1/0 AWG water impervious XLPE insulated power cable, a laminate tape consisting of electrically conductive polyethylene (50 μm thick), aluminum (20 μm thick), and electrically conductive polyethylene (50 μm thick) was longitudinally applied onto an insulation shield of a cable core with an overlapping allowance of approximately 20 mm. Thereafter, a semiconductive cloth tape (0.25 mm thick), which was obtained by topping-treating a polyester base cloth with electrically conductive rubber, was wound around the structure with a ½ lap. This was then passed through a heating furnace to bond the laminate tape and the insulation shield into one body. Then, sixteen copper wires, each having a diameter of 1.6 mm, were spirally arranged around the structure, a hold tape was wound around the structure, and flame-retardant polyvinyl chloride was extruded onto the copper wires, thus manufacturing the power cable. This power cable was subjected to the same test as Example 1. The results are shown in Table 1. In the case of this power cable, the aluminum tape developed cracks after 200 heat cycles, making it impossible to continue the heat cycle test thereafter.

TABLE 1

| | Number of Heat Cycles (Number of times) | | | | |
|---|---|---|---|---|---|
| | 50 | 100 | 150 | 200 | 250 |
| Example 1 | | | | | |
| Example 2 | | | | | |

TABLE 1-continued

| | Number of Heat Cycles (Number of times) | | | | |
|---|---|---|---|---|---|
| | 50 | 100 | 150 | 200 | 250 |
| Control 1 | | | | Δ | X |
| Control 2 | | | Δ | X | — |

What is claimed is:

1. A water impervious insulated power cable comprising:
    a cable core including a conductor, an extruded conductor shield over said conductor, a rubber or plastic insulation layer over said conductor shield, and an extruded insulation shield over said rubber or plastic insulation layer;
    a water impervious layer provided around said cable core and which includes a laminated tape comprised of a metal foil and a plastic layer laminated on at least one surface of said metal foil;
    a jacket layer extruded directly over the plastic layer of said water impervious layer so that said jacket layer becomes integral with the plastic layer of said water impervious layer by heat at the time of the extrusion;
    a metal shield layer provided around said extruded jacket layer and which comprises metallic wires; and
    a corrosion-protective layer extruded on said metal shield layer and in which said metal shield layer is embedded.

2. The water impervious insulated power cable according to claim 1, wherein the metal foil is a lead foil.

3. The water impervious insulated power cable according to claim 1, wherein the metal foil is an aluminum foil.

4. The water impervious insulated power cable according to claim 1, wherein the metal foil is a copper foil.

5. The water impervious insulated power cable according to claim 1, wherein the thickness of the metal foil ranges from 0.010 to 0.10 mm.

6. The water impervious insulated power cable according to claim 1, wherein the thickness of the laminated plastic layer of said water imperious layer ranges from 0.05 to 0.20 mm.

7. The water impervious insulated power cable according to claim 1, wherein the water impervious layer comprises a single-side laminated tape comprised of said metal foil and said plastic layer, and wherein said plastic layer comprises an electrically conductive plastic film laminated on one surface of said metal foil.

8. The water impervious insulated power cable according to claim 7, wherein said electrically conductive plastic film of said single-side laminated tape faces said extruded jacket layer.

9. The water impervious insulated power cable according to claim 1, wherein said plastic layer of said water impervious layer comprises an electrically conductive plastic film, and wherein the electrically conductive plastic film and the extruded jacket layer are fusion-bonded into a united integral body.

10. The water impervious insulated power cable according to claim 1, wherein said laminated tape of said water impervious layer is arranged longitudinally along the cable core and covers the cable core, said laminated tape having longitudinal edge portions which overlap by a circumferential distance of from 5 to 40 mm.

11. The water impervious insulated power cable according to claim 1, wherein said water impervious layer comprises a double-side laminated tape comprised of said metal foil and an electrically conductive plastic film laminated on each surface of said metal foil.

12. The water impervious insulated power cable according to claim 10, wherein said plastic layer of said water impervious layer comprises an electrically conductive plastic film, and wherein said laminated tape has overlapping edge portions which are overlapped such that electrically conductive plastic film portions thereof are fusion-bonded to each other.

13. The water impervious insulated power cable according to claim 1, wherein:
    said jacket layer is an extruded semiconductive jacket layer;
    said plastic layer of said water impervious layer comprises an electrically conductive plastic film; and
    said metal foil of said water impervious layer is electrically connected to the metallic wires of the metal shield layer via said electrically conductive plastic film and said extruded semiconductive jacket layer.

14. The water impervious insulated power cable according to claim 1, wherein said plastic layer of the water impervious layer is in close contact with said cable core and is not completely fusion-bonded thereto.

15. The water impervious insulated power cable according to claim 1, wherein said cable core comprises a plurality of said conductors, said plurality of conductors comprising stranded wires, gaps between said conductors being filled with a waterproof semiconductive compound.

16. The water impervious insulated power cable according to claim 1, wherein said water impervious layer comprises electrically conductive plastic film layers on both opposite surfaces of said metal foil layer.

* * * * *